Oct. 12, 1937.  G. A. GLEASON ET AL  2,095,599
METHOD OF MAKING FLEXIBLE CONDUITS FOR CABLE CONTROLS
Filed Feb. 21, 1935
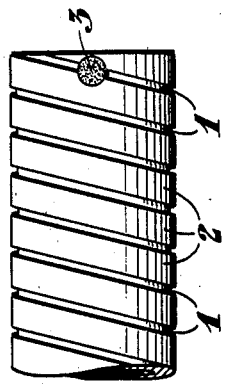
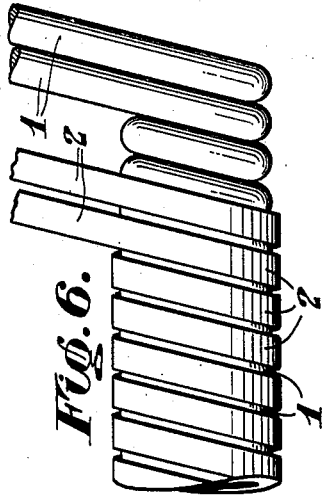
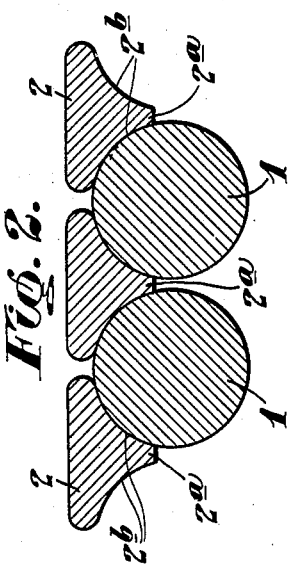
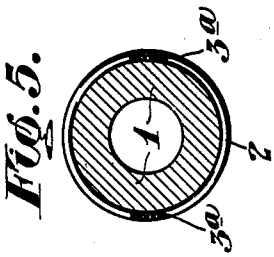
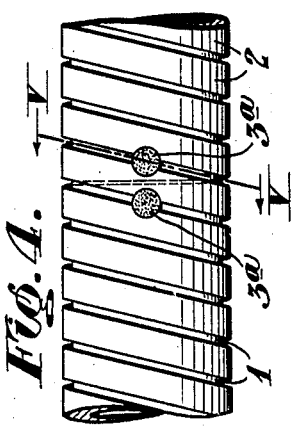
Inventors:
GEORGE A. GLEASON and
CARL E. STOLNACKE.
by: *their Attorneys.*

Patented Oct. 12, 1937

2,095,599

UNITED STATES PATENT OFFICE 2,095,599

METHOD OF MAKING FLEXIBLE CONDUITS FOR CABLE CONTROLS

George A. Gleason and Carl E. Stolnacke, Worcester, Mass., assignors to The American Steel and Wire Company of New Jersey, a corporation of New Jersey Application February 21, 1935, Serial No. 7,624

3 Claims. (Cl. 29—148.2)

This invention relates to flexible conduits for cable controls such as are now quite commonly used to operate the brakes of automobiles, one of the objects being to provide a conduit of this character which is an improvement on those heretofore known respecting its wearing qualities and its rigidity to length variations under load. Another object is to provide an improved method of making such a conduit. Other objects may be inferred.

Referring to the accompanying drawing:

Figure 1 shows a long length of conduit constructed according to the invention.

Figure 2 shows the arrangement of the individual wires from which the conduit is made.

Figure 3 shows the end of the conduit as finished for use but without the usual end fitting.

Figure 4 illustrates a method of dividing the conduit into shorter lengths.

Figure 5 is a cross-section from Figure 4 on the line V—V.

Figure 6 illustrates the making of the conduit.

The conduit illustrated by the above described drawing includes a plurality of round wires 1 that are tandem coiled into tubular form, and a plurality of T-sectioned wires 2 that are tandem coiled tightly over the first named wires with their stem portions 2a extending inwardly between the latter.

All of these wires are made from high carbon steel and the stem portions 2a of the wires 2 are shaped as at 2b to seat against the wires 1.

The ends of the conduit are oppositely spot-welded at points effecting interconnection of the respective ends of all of the wires. The welded points are numeraled 3. Since they are located on opposite sides of the conduit they interconnect all of the wires of which it is composed.

It is to be noted that the conduit being described is made from wires tandem-wound in two's. Therefore, the two oppositely located welds made in the valleys between the wires 2, as is illustrated, are sufficient to interconnect all four of the wires because they result in fastening the adjacent edge portions of the two wires 2 to the central surfaces of the two wires 1.

The conduit just described is made by tandem-coiling the wires 1 into tubular form, tandem-coiling the wires 2 tightly over the wires 1 so that their stem portions 2a extend inwardly between the latter, and then swaging or hammering the wires 2 so as to force their stem portions 2a between the wires 1, this swaging or hammering being done with just sufficient force to slightly deaden the various wires so as to reduce their tendency to recoil without materially affecting the diameter of the conduit.

It is obvious that the conduit produced by the above operations can only be economically made in a much longer length than is usually required when used to house the cable control of an automobile brake. In view of this, the invention also includes a way of dividing such a long length of flexible conduit of the character described into shorter lengths.

This is done by oppositely spot-welding the long lengths of conduit at points between adjacent edge portions of the wires 2 so as to connect the same with the wires 1. This has previously been described in connection with the description of the conduit itself, but it should be here noted that a plurality of spot welds, numeraled 3a in the drawing, are made on each side of the conduit. After the welds are made, the conduit is transversely cut between the same so as to divide the conduit at this point. Each group of welds is made at points spaced according to the lengths into which the conduit must be divided.

This method of dividing the conduit provides an assurance that the various wires will not be displaced by the cutting operations. In addition, the wires are positively held against recoiling when cut, whereby their positions, initially determined by the tightness of the coiling of the wires 2 and the extent of the swaging or hammering, are preserved. When the conduit is in service, the interconnection of all of the wires of which it is composed prevents individual displacement of the same.

It is to be understood that the coiling described may be done by any known means, such as by a suitably designed spring coiler. Also, that the swaging or hammering operation may likewise be done in any known manner, such as by the use of a swaging machine having a suitably designed rotary die.

Although specific examples of the invention are shown and described in accordance with the patent statutes, it is not intended to limit the scope of the invention exactly thereto, except as defined by the following claims.

We claim:

1. A method of dividing a long length of flexible conduit into shorter lengths, said conduit including a plurality of wires that are tandem coiled into tubular form, and a plurality of T-sectioned wires that are tandem coiled tightly over the first named wires with their stem portions extending inwardly between the latter, said method including oppositely spot-welding said conduit at points between the adjacent edge portions of the above said T-sectioned wires so as to connect the same to the above first named wires, and then transversely cutting said conduit between said points.

2. In a method of making a flexible conduit, including tandem coiling a plurality of wires into tubular form, tandem coiling a plurality of T-sectioned wires tightly over the first named wires so that their stem portions extend inwardly between the latter, and swaging or hammering said T-sectioned wires so as to force their stem portions firmly between the first named wires and with sufficient force to at least slightly deaden the said wires so as to reduce their tendency to recoil.

3. A method of making a flexible conduit, including tandem coiling a plurality of wires into tubular form, tandem coiling a plurality of T-sectioned wires tightly over the first named wires so that their stem portions extend inwardly between the latter, and swaging or hammering said T-sectioned wires so as to force their stem portions firmly between the first named wires and with sufficient force to at least slightly deaden the said wires so as to reduce their tendency to recoil, whereby a long length of flexible conduit results, then oppositely spot-welding said conduit at points between the adjacent edge portions of said T-sectioned wires so as to connect the same to the first named wires, and transversely cutting said conduit between said points.

GEORGE A. GLEASON.
CARL E. STOLNACKE.